(12) United States Patent
Chen

(10) Patent No.: US 8,493,394 B2
(45) Date of Patent: Jul. 23, 2013

(54) METHOD AND APPARATUS FOR ENHANCING THE GRAPHICS CAPABILITY OF A MOBILE COMPUTING DEVICE

(75) Inventor: Sien Chen, Guangdong (CN)

(73) Assignee: Nvidia Corporation, Santa Clara, CA (US)

( * ) Notice: Subject to any disclaimer, the term of this patent is extended or adjusted under 35 U.S.C. 154(b) by 1106 days.

(21) Appl. No.: 12/018,087

(22) Filed: Jan. 22, 2008

(65) Prior Publication Data

US 2009/0172241 A1 Jul. 2, 2009

(30) Foreign Application Priority Data

Dec. 28, 2007 (CN) .......................... 2007 1 0306933

(51) Int. Cl.
 *G06F 13/14* (2006.01)
 *G06F 15/16* (2006.01)
(52) U.S. Cl.
 USPC ............................ 345/520; 345/502; 710/300
(58) Field of Classification Search
 USPC ........................................................ 713/300
 See application file for complete search history.

(56) References Cited

U.S. PATENT DOCUMENTS

| | | | |
|---|---|---|---|
| 6,209,105 B1 * | 3/2001 | Hamamoto .................... | 713/300 |
| 7,404,090 B1 * | 7/2008 | Lewicki et al. ............... | 713/300 |
| 7,663,633 B1 * | 2/2010 | Diamond et al. ............. | 345/503 |
| 7,739,527 B2 * | 6/2010 | Rothman et al. ............. | 713/320 |
| 2005/0253828 A1 * | 11/2005 | Jeong ............................ | 345/204 |
| 2006/0149976 A1 * | 7/2006 | Vaserfirer ..................... | 713/300 |
| 2006/0161793 A1 * | 7/2006 | Orr ................................ | 713/300 |
| 2007/0239913 A1 * | 10/2007 | Knepper et al. .............. | 710/104 |
| 2007/0283175 A1 * | 12/2007 | Marinkovic et al. ......... | 713/320 |
| 2008/0059813 A1 * | 3/2008 | Khodorkovsky et al. ..... | 713/300 |
| 2008/0204460 A1 * | 8/2008 | Marinkovic et al. ......... | 345/502 |
| 2009/0150691 A1 * | 6/2009 | Chen et al. .................... | 713/310 |

OTHER PUBLICATIONS

Ravi Budruk et al. "PCI Express System Architecture", p. 178-179, 199-200, 213, Sep. 4, 2003, Addison-Wesley, ISBN-10: 0-321-15630-7.*

Budruk et al. "PCI Express System Architecture", ISBN-10 0-321-15630-7, Addison-Wesley, Sep. 2004, academic.safaribooksonline.com, p. 173-220.*

Shimpi "NVIDIA's GeForce 6 SLI: Demolishing Performance Barriers", Nov. 2004.*

* cited by examiner

*Primary Examiner* — Tize Ma
*Assistant Examiner* — Yingchun He
(74) *Attorney, Agent, or Firm* — Patterson & Sheridan, L.L.P.

(57) ABSTRACT

One embodiment of the present invention sets forth a method, which includes the steps of detecting the presence of an external graphics subsystem after the external graphics subsystem is attached to the mobile computing device, transmitting a power enable signal to the external graphics subsystem, and activating PCIe signaling channels after having received a ready signal from the external graphics subsystem to enable data communications between the mobile computing device and the external graphics subsystem.

19 Claims, 3 Drawing Sheets

METHOD AND APPARATUS FOR ENHANCING THE GRAPHICS CAPABILITY OF A MOBILE COMPUTING DEVICE

CROSS-REFERENCE TO RELATED APPLICATIONS

This application claims the priority benefit of People's Republic of China SIPO Application No. 200710306933.3, filed on Dec. 28, 2007 in the People's Republic of China.

BACKGROUND OF THE INVENTION

1. Field of the Invention

The present invention generally relates to a graphics system, and more particularly to an apparatus and method for enhancing the graphics capability of a mobile computing device.

2. Description of the Related Art

Unless otherwise indicated herein, the approaches described in this first portion are not prior art to the claims in this application and are not admitted to be prior art by inclusion in this section.

A computer system such as a desktop computer or a laptop computer typically includes peripheral devices such as a graphics card dedicated to the rendering of images. Peripheral Component Interconnect Express (PCIe) bus has been adopted by the industry as the standard bus interface for coupling the graphics card to the computer system.

For a desktop computer, a number of PCIe slots are typically supported to receive multiple PCIe peripheral devices. The standardized dimension for a PCIe graphics card is 311 mm (length) by 106 mm (width). A PCIe graphics card with this dimension is acceptable in the desktop computer, since the accessibility of the components inside the desktop computer is generally considered more important than the miniaturization of the components. However, a PCIe graphics card with this dimension can only be used in a desktop computer. For a laptop computer, such a PCIe graphics card with the standardized dimension needs to be reduced considerably to be able to fit into the laptop computer.

Currently, a mobile PCIe module has been developed to enable the implementation of a graphics subsystem in a laptop computer. Specifically, the mobile PCIe module is essentially a reduced size graphics card with the standardized dimension ranging from 68-117 mm (length) by 70-82 mm (width). The mobile PCIe module is coupled to the motherboard of the laptop computer through an edge connector at the integration sites. The mobile PCIe module includes a card-edge connector with plated contacts and is received by the PCIe compatible interface connector supported by the motherboard of the laptop computer. One of the most popular types of PCIe compatible interface connector is a Low Insertion Force (LIF) angled entry surface mount connector. The mobile PCIe module can be inserted to the LIF connector by placing the mobile PCIe module at a 20 to 30 degree angle, rotating the module towards the motherboard, and then fastening the module into mechanical mounting stand-offs at the integration sites.

However, this kind of insertion method presents one notable shortcoming. Due to the limited space on the motherboard of a laptop computer, placing more than one mobile PCIe module, each at an angle, is difficult. In addition, the laptop computer needs to be powered off and often physically opened up before the insertion of the mobile PCIe module can take place. In other words, there lacks a simple way to enhance the graphics capability of the laptop computer.

Moreover, if somehow more than one mobile PCIe module is included on the motherboard of a conventional laptop computer, then there needs to be a mechanism to intelligently manage the power consumption of the added mobile PCIe modules, which can consume significant amount of power.

As the foregoing illustrates, what is needed is a method and device capable of enhancing the graphics capability of a mobile computing device and addresses at least the problems set forth above.

SUMMARY OF THE INVENTION

A method and apparatus for enhancing the graphics capability of a mobile computing device are disclosed. One embodiment of the present invention sets forth a method, which includes the steps of detecting the presence of an external graphics subsystem after the external graphics subsystem is attached to the mobile computing device, transmitting a power enable signal to the external graphics subsystem, and activating PCIe signaling channels after having received a ready signal from the external graphics subsystem to enable data communications between the mobile computing device and the external graphics subsystem.

One advantage of the disclosed method and system is to enable a mobile computing device to enhance its processing capabilities while still maintaining power efficiency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
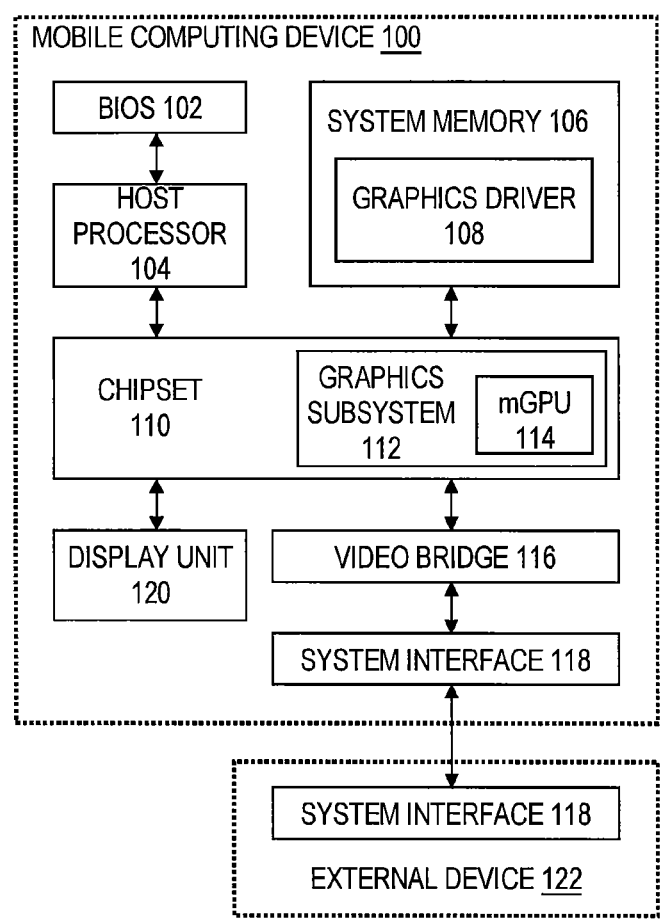
FIG. 1 is a block diagram showing a mobile computing device connected to an external graphics subsystem configured to implement one or more aspects of the present invention.

FIG. 1 is a block diagram showing a mobile computing device 100 connected to an external graphics subsystem configured to implement one or more aspects of the present invention. The mobile computing device 100 includes a host processor 104, BIOS 102, system memory 106, a chipset 110 that is directly coupled to a graphics subsystem 112, and a display unit 120. BIOS 102 is a program stored in read only memory (ROM) or flash memory that is run at bootup. The graphics system 112 includes a mobile integrated GPU (mGPU) 114. The computing device 100 further includes a video bridge 116. The video bridge 116 provides an interface between the mGPU 114 on the chipset 110 and any external graphics system via system interface 118. The system interface 118 support symmetric communication links, such as, without limitation, a standard PCIe bus. A "symmetric" communication link here refers to any two-way link with substantially identical or identical downstream and upstream data transmission speed. In one implementation, the graphics subsystem 112 is integrated on the motherboard of the mobile computing device 100. Alternatively, the graphics subsystem 112, such as a mobile PCIe module, is added to the motherboard of the mobile computing device 100. Here, one of the functions of the video bridge 116 is to enhance the strength of signal communications between the various graphics subsystems.

As shown in FIG. 1, an external device 122 is connected to the mobile computing device 100 through the same system interface 118 supported in the mobile computing device 100. A detailed discussion regarding how the mobile computing device 100 and the external device 122 communicate will be provided in the next paragraph.

Figure 2:
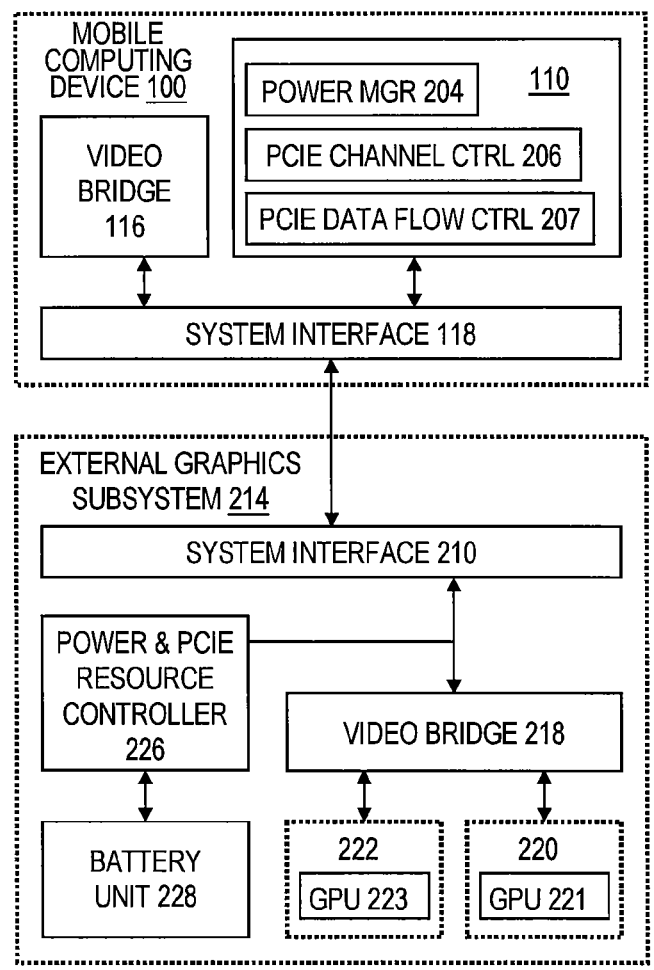
FIG. 2 is a block diagram showing the coupling of an external graphics subsystem and the mobile computing device of FIG. 1, according to one embodiment of the present invention.

Supplementing the description associated with FIG. 1, FIG. 2 is a block diagram showing the coupling of an external graphics subsystem 214 and the mobile computing device 100, according to one embodiment of the present invention. The external graphics subsystem 214 corresponds to the external device 122 and includes a system interface 210, a power and PCIe resource controller 226 coupled with a battery unit 228, and a video bridge 218 coupled with a first mobile PCIe module 220 and a second mobile PCIe module 222. The first mobile PCIe module 220 includes a GPU 221, and the second mobile PCIe module 222 includes a GPU 223. Although two mobile PCIe modules are currently shown, a person with ordinary skills in the art will recognize that other configurations with a different number of mobile PCIe modules are possible without exceeding the scope of the present invention. The power and PCIe resource controller 226 is configured to transmit signals representative power status information of the external graphics subsystem 214 to the mobile computing device 100 and also transmit signals to the battery unit 228 to manage power supply to the external graphics subsystem 214. In one implementation, the power and PCIe resource controller 226 is activated by a power manager 204 located in the chipset 110 of the mobile computing device 100. Detailed discussion of such implementation will be provided in the next paragraph.

Referring to FIG. 2, in one implementation, the system interface 210 supports the standardized PCIe interface and the various physical connectors that are designed to be compatible with the PCIe interface. Here, the external graphics subsystem 214 is linked to the mobile computing device 100 via a cable, such a Standard PCIe Generation 2 Cable, and through the system interface 210. In one configuration, the connector for the mobile computing device 100 to receive the standardized PCIe cable is at an external side of the mobile computing device 100 so that it is easily accessible. Both the system interface 210 and the cable support a link up to sixteen bi-directional PCIe differential signaling channels. In one implementation, they are also configured to be backward compatible, so that the PCI Express Base Specification 1.1 or earlier specifications are supported. Thus, whenever the mobile computing device 100 has needs for extra computation capabilities, the external graphics subsystem 214 can be flexibly coupled to the mobile computing device 100 and is configured to link the GPUs 221 and 223 in the external graphics subsystem 214 to the mGPU 114 in the mobile computing device through the system interfaces. In one implementation, the mobile computing device 100 may configure the external graphics subsystem 214 differently according to the operating modes of the mobile computing device (e.g., 2D mode and 3D mode). For example, in one configuration, when the external graphics subsystem 214 is connected to the mobile computing device 100, the default operating mode for the mobile computing device 100 is set to the 3D mode. After booting up, a software application running on the mobile computing device 100 may determine whether the device should remain in the 3D mode. If the 3D mode is not needed, the software application switches to the 2D mode and causes the external graphics subsystem 214 to be disabled so that system resources are not unnecessarily consumed. The 3D mode may be re-activated if a pre-determined workload threshold of the mGPU 114 is reached. The threshold may be monitored by the same software application running on the mobile computing device 100. When the threshold is reached, the workload of the mGPU 114 then is distributed to the GPUs 221 and 223 in the external graphics subsystem 214 for processing. With the external graphics subsystem 214, the capability of the graphics subsystem 112 in the mobile computing device 100 can be greatly increased. It should be apparent to a person with ordinary skills in the art to also utilize the additional computation capabilities of the external graphics subsystem 214 to share the loading imposed on the host processor 104 of FIG. 1, if certain pre-determined or configurable workload threshold is reached.

Referring to FIG. 2, the power and PCIe resource controller 226 is further configured to manage the PCIe resources of the external graphics subsystem 214. To ensure the external graphics subsystem 214 consumes power in an efficient manner, the PCIe resources in the system are not always powered on. In one implementation, the power and PCIe resource controller 226 is activated by a PCIe data flow controller 207 located on the chipset 110 of the mobile computing device 100. As discussed before, when a pre-determined workload threshold of the mGPU 114 is reached, the workload of the mGPU 114 is distributed to the GPUs 221 and 223 in the external graphics subsystem 214. The PCIe data flow controller 207 first waits for a power ready signal from the power and PCIe resource controller 226 in the external graphics subsystem 214 destined for the power manager 204 in the chipset 110 of the mobile computing device 100. When the power ready signal is received, the power manager 204 sends a signal to the PCIe channel controller 206 in the chipset 110 to let the PCIe channel controller 206 know that power is ready. The PCIe channel controller 206 then prepares the channel to be opened and ensures the data associated with the workload to be distributed to the external graphics subsystem 214 for processing is ready. Then, the PCIe channel controller 206 sends an activation signal to the PCIe data flow controller 207 to activate the bi-directional PCI Express differential signaling channel between the external graphics subsystem 214 and the mobile computing device 100. After the signaling channels are successfully activated, then the data is sent via the system interface for the external graphics subsystem 214 to process. In one implementation, the chipset 110 utilizes General Purpose Input/Output (GPIO) to drive and also to receive the aforementioned signals.

Still referring to FIG. 2, the video bridge 218 provides an efficient interface for the GPUs in the mobile PCIe modules to communicate with each other. The video bridge 218 also allows the GPU 221 and 223 in the mobile PCIe modules 220 and 222, respectively, of the external graphics subsystem 214 to communicate with the mGPU 114 of the mobile computing device 100 in a more direct and efficient manner. This communication is achieved by creating a connection between the video bridge 116 on the mobile computing device 100 and the video bridge 218 on the external graphics subsystem 214.

After the connection is established, the GPU 221 and 223 and the mGPU 114 can communicate with each other through this connection.

The connections made available through the video bridges and the system interfaces among the GPUs 221 and 223 in the external graphics subsystem 214 and the mGPU 114 in the mobile communication device 100 are important, because workload and status information can be distributed among the GPUs efficiently. By distributing the workload, the capabilities of the graphics subsystem 112 of the mobile computing device 100 or even the overall processing capabilities of the mobile computing device 100 can be significantly enhanced by the external graphics subsystem 214.

Furthermore, when the external graphics subsystem 214 is connected to the mobile computing device 100, one implementation of the mobile computing device 100 monitors the power consumption levels of the external graphics subsystem 214. As previously described, the external graphics subsystem 214 is equipped with the power controller 226 and the battery unit 228 and is managed by the power manager 204 in the mobile computing device 100.

Figure 3:
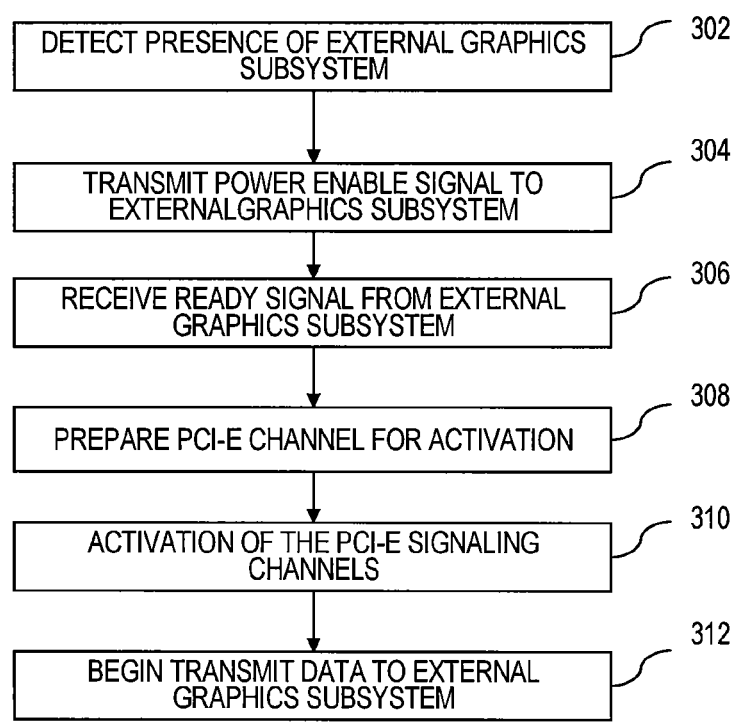
FIG. 3 is a flow chart illustrating the method steps of managing power consumption at an external graphics subsystem, according to one embodiment of the present invention.

In conjunction with FIG. 2, FIG. 3 is a flow chart illustrating the method steps of managing power consumption at the external graphics subsystem 214, according to one embodiment of the present invention. Suppose the mobile computing device 100 is attached to the external graphics subsystem 214. In step 302, the mobile computing device 100 detects the presence of the external graphics subsystem 214 at bootup. After detecting the external graphics subsystem 214, a power enable signal is transmitted to the external graphics subsystem 214 in step 304. In one implementation, the power manager 204 sends the power enable signal. In response to the power enable signal and if the external graphics subsystem 214 is appropriately powered up, in step 306, the mobile computing device 100 receives a ready signal to proceed. After the power manager 204 receives this ready signal, it sends another signal to the PCIe channel controller 206 for the purpose of preparing the signaling channels for activation in step 308. After the signaling channels are ready to be opened, an activation signal is sent to the PCIe data flow controller 207 for the purpose of activating the PCIe signaling channels in step 310. The PCIe data flow controller 207 then transmits an activation signal to the power and PCIe resource controller 226 in the external graphics subsystem 214 to complete the activation of the PCIe signaling channels. After activation has been complete, data transmission to the external graphics subsystem 214 then can begin in step 312.

While the foregoing is directed to embodiments of the present invention, other and further embodiments of the invention may be devised without departing from the basic scope thereof, and the scope thereof is determined by the claims that follow.

We claim:

1. A method for enhancing the graphics capability of a mobile computing device, comprising:
   detecting the presence of an external graphics subsystem after the external graphics subsystem is attached to the mobile computing device, wherein the external graphics subsystem includes a video bridge coupled to a first mobile graphics module and a second mobile graphics module and configured to establish a connection to a corresponding video bridge in the mobile computing device;
   determining that a workload of the mobile computing device is above a threshold value;
   in response to determining that the workload is above the threshold value, then:
   transmitting a power enable signal to the external graphics subsystem, and
   activating PCIe signaling channels after having received a ready signal from the external graphics subsystem to enable data communications between the mobile computing device and the external graphics subsystem; and
   receiving an indication from a software application that a three-dimensional (3D) mode is not needed, switching to a two-dimensional (2D) mode, and disabling the external graphics subsystem.

2. The method of claim 1, further comprising, in response to determining that the workload is above the threshold value, preparing the PCIe signaling channels to be opened prior to activating the PCIe signaling channels.

3. The method of claim 1, further comprising, in response to determining that the workload is above the threshold value:
   sending a first activation signal to a PCIe data flow controller in the mobile computing device to initiate activating the PCIe signaling channels; and
   sending a second activation signal to a power and PCIe resource controller in the external graphics subsystem to complete activating the PCIe signaling channels.

4. The method of claim 3, further comprising configuring a General Purpose Input/Output (GPIO) to send the second activation signal.

5. The method of claim 3, further comprising configuring a General Purpose Input/Output (GPIO) to receive the ready signal.

6. The method of claim 1, further comprising attaching the external graphics subsystem to the mobile computing device via a standardized cable and an external connector at a side of the mobile computing device.

7. A mobile computing device configured to support an external graphics subsystem, the mobile computing device comprises:
   a host processor;
   a system interface;
   a video bridge configured to establish a connection to a corresponding video bridge in the external graphics subsystem via the system interface; and
   a chipset, wherein the chipset is configured to:
   detect the presence of the external graphics subsystem after the external graphics subsystem is attached to the mobile computing device,
   determine that a workload of the mobile computing device is above a threshold value;
   in response to determining that the workload is above the threshold value, then:
   transmit a power enable signal to the external graphics subsystem, and
   activate PCIe signaling channels after having received a ready signal from the external graphics subsystem to enable data communications between the mobile computing device and the external graphics subsystem; and
   receive an indication from a software application that that a three-dimensional (3D) mode is not needed, switch to a two-dimensional (2D) mode, and disable the external graphics subsystem.

8. The mobile computing device of claim 7, wherein the chipset is further configured to, in response to determining that the workload is above the threshold value, prepare the PCIe signaling channels to be opened prior to activating the PCIe signaling channels.

9. The mobile computing device of claim 8, wherein the chipset further includes:

a power manager;
a PCIe channel controller; and
a PCIe data flow controller, wherein
the power manager sends a first activation signal to the PCIe channel controller to initiate preparing the PCIe signaling channels,
the PCIe channel controller sends a second activation signal to the PCIe data flow controller to initiate activating the PCIe signaling channels, and
the PCIe data flow controller sends a third activation signal to a power and PCIe resource controller in the external graphics subsystem to complete activating the PCIe signaling channels.

10. The mobile computing device of claim 9, wherein the chipset further includes a General Purpose Input/Output (GPIO) configured to send the third activation signal.

11. The mobile computing device of claim 9, wherein the chipset further includes a General Purpose Input/Output (GPIO) to receive the ready signal.

12. The mobile computing device of claim 7, wherein the mobile computing device further includes an external connector at a side of the mobile computing device to attach to the external graphics subsystem via a standardized cable.

13. The mobile computing device of claim 7, further comprising an internal graphics subsystem integrated into the chipset, wherein the internal graphics subsystem communicates with the external graphics subsystem via the video bridge.

14. An external graphics subsystem, comprising:
a system interface;
a video bridge, coupled to a first mobile graphics module and a second mobile graphics module and configured to establish a connection to a corresponding video bridge in a mobile computing device to which the external graphics subsystem is attached;
a power and PCIe resource controller configured to transmit a ready signal to the mobile computing device and to monitor data flow and complete activating PCIe signaling channels according to a signal from the mobile computing device; and
a battery unit,
wherein the mobile computing device is configured to:
determine that a workload of the mobile computing device is above a threshold value,
in response to determining that the workload is above the threshold value, then transmit a power enable signal to the power and PCIe resource controller; and
receive an indication from a software application that a three-dimensional (3D) mode is not needed, switch to a two-dimensional (2D) mode, and disable the external graphics subsystem.

15. The external graphics subsystem of claim 14, wherein the PCIe signaling channels are reconfigured in response to a change in the operating mode of the mobile computing device.

16. The external graphics subsystem of claim 14, wherein the video bridge is further configured to provide an interface for the first mobile graphics module to communicate with the second mobile graphics module directly.

17. The external graphics subsystem of claim 14, wherein the system interface is a standard PCIe interface.

18. The external graphics subsystem of claim 17, wherein the external graphics subsystem is connected via a standardized cable to an external connector at a side of the mobile computing device.

19. A method for enhancing the graphics capability of a mobile computing device, comprising:
detecting the presence of an external graphics subsystem after the external graphics subsystem is attached to the mobile computing device;
determining that a workload of the mobile computing device is above a threshold value;
in response to determining that the workload is above the threshold value, then:
transmitting a power enable signal to the external graphics subsystem, and
activating PCIe signaling channels after having received a ready signal from the external graphics subsystem to enable data communications between the mobile computing device and the external graphics subsystem, and
receiving an indication from a software application that a three-dimensional (3D) mode is not needed, switching to a two-dimensional (2D) mode, and disabling the external graphics subsystem;
communicating data between the mobile computing device and a mobile graphics module in the external graphics subsystem via a connection between a video bridge of the external graphics subsystem and a corresponding video bridge in the mobile computing device.

* * * * *